UNITED STATES PATENT OFFICE.

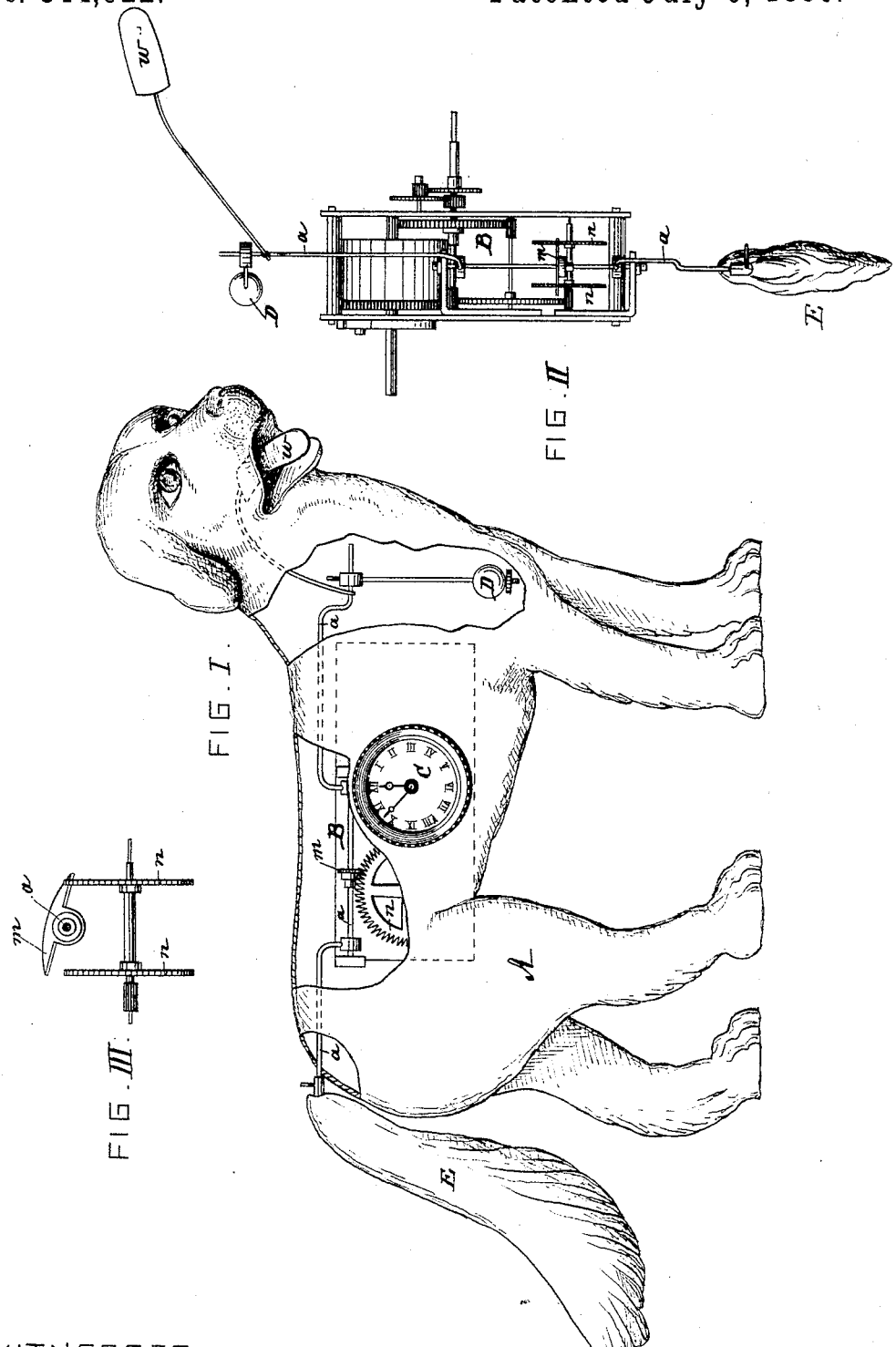

OSWALD REBENTISCH, OF SALEM, VIRGINIA.

MECHANICAL CLOCK.

SPECIFICATION forming part of Letters Patent No. 344,922, dated July 6, 1886.

Application filed September 15, 1885. Serial No. 177,140. (No model.)

*To all whom it may concern:*

Be it known that I, OSWALD REBENTISCH, of the city of Salem, county of Roanoke, State of Virginia, have invented an Improvement in Clocks, of which the following specification is a full, clear, and exact description.

This invention relates to a clock inclosed within a case representing an animal, and constructed to oscillate the tongue and tail of such animal.

The invention consists in the elements of improvement hereinafter more fully pointed out.

In the accompanying drawings, Figure I represents a side view of the casing representing a dog, partly in section, showing partly the arrangement of the clock-movement in the body of the animal. Fig. II is a top view of the clock-movement, and Fig. III an end view of the escapement.

A is the casing, representing a dog; but the form of any other animal may be used for the same. In the body of the case A the clock-movement B is arranged, with the dial C exposed to view on one side of the animal. The spindle $a$, which carries the pallets $m$, acting upon the escapement-wheels $n$, is arranged at right angle to the shaft of the gear-wheels $n$, and is extended nearly the whole length of the animal. This spindle $a$ is revolved alternately to the right and left by the clock-movement, and carries the usual pendulum, $d$, which is made to swing backward and forward. To one end of spindle $a$ is attached a tongue, $w$, protruding through the open mouth of the animal, while to the other end of the spindle the tail E is attached. By this arrangement the tongue $w$ and tail E will receive a motion corresponding with the movement of the spindle $a$ or pendulum $d$. In some cases the pendulum $d$ may be dispensed with, and the tail-piece E can be constructed to act as a pendulum.

What I claim is—

The combination of clock-case A with spindle $a$ extending longitudinally through the same, and receiving vibratory motion from the movement, and with the tail E and tongue $w$, attached to the ends of such spindle, substantially as specified.

OSWALD REBENTISCH.

Witnesses:
J. W. BRUFFEY,
E. M. ARMSTRONG, Jr.